US012713473B2

(12) United States Patent
Müller et al.

(10) Patent No.: US 12,713,473 B2
(45) Date of Patent: Aug. 18, 2026

(54) OVERLAYED CELL ACCESS HANDLING

(71) Applicant: Telefonaktiebolaget LM Ericsson (publ), Stockholm (SE)

(72) Inventors: Walter Müller, Upplands Väsby (SE); Patrik Karlsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 759 days.

(21) Appl. No.: 18/011,851

(22) PCT Filed: Jun. 23, 2020

(86) PCT No.: PCT/EP2020/067552

§ 371 (c)(1), (2) Date: Dec. 21, 2022

(87) PCT Pub. No.: WO2021/259458

PCT Pub. Date: Dec. 30, 2021

(65) Prior Publication Data

US 2023/0269790 A1 Aug. 24, 2023

(51) Int. Cl.
*H04W 76/10* (2018.01)
*H04W 56/00* (2009.01)
*H04W 74/0833* (2024.01)

(52) U.S. Cl.
CPC ....... *H04W 76/10* (2018.02); *H04W 56/0015* (2013.01); *H04W 74/0833* (2013.01)

(58) Field of Classification Search
CPC ............. H04W 76/10; H04W 56/0015; H04W 74/0833; H04W 48/16; H04W 48/12; H04B 7/024
See application file for complete search history.

(56) References Cited

U.S. PATENT DOCUMENTS

2019/0110314 A1 4/2019 Abedini et al.
2019/0364599 A1* 11/2019 Islam .................. H04W 74/004

FOREIGN PATENT DOCUMENTS

EP 651404 A1 5/2020
EP 3651404 A1 5/2020

OTHER PUBLICATIONS

International Search Report and Written Opinion of the International Searching Authority, PCT/EP2020/067552, mailed Mar. 12, 2021, 14 pages.
3GPP TSG-RAN WG2 Meeting #105bis, R2-1904844, Xi'an, China, Apr. 8-12, 2019, Agenda Item 11.12.1, Huawei, et al., "Overview on SON for RDC," (XP051702121) 3 pages.

* cited by examiner

*Primary Examiner* — Ayanah S George
(74) *Attorney, Agent, or Firm* — Sage Patent Group

(57) ABSTRACT

A method of establishing a connection between a wireless device and a wireless communication network includes receiving, at a first transmission/reception point, TRP, a random access request from the wireless device on a random access channel of a first cell associated with the first TRP, and transmitting, by the first TRP, a synchronization signal block, SSB, equivalent indication to the wireless device, wherein the SSB equivalent indication corresponds to a second cell.

19 Claims, 14 Drawing Sheets

FREQUENCY
71
72
TIME

FREQUENCY
71
72
TIME

FREQUENCY
71
72
TIME

FREQUENCY
72
71

FREQUENCY
71
72
TIME

FREQUENCY
71
71
72

OVERLAYED CELL ACCESS HANDLING

CROSS REFERENCE TO RELATED APPLICATIONS

This application is a 35 U.S.C. § 371 national stage application of PCT International Application No. PCT/EP2020/067552 filed on Jun. 23, 2020, the disclosure and content of which is incorporated by reference herein in its entirety.

TECHNICAL FIELD

The inventive concepts generally relate wireless communication systems, and in particular to accessing of cells supported by multiple transmit/receive points.

BACKGROUND

Many wireless communication networks, such as those that operate according to the 3GPP Long Term Evolution (LTE) and/or New Radio (NR) specifications, provide service over large coverage areas by dividing the coverage areas into small regions, called cells, that are served by different transmission/reception points (TRPs) within a radio access network (RAN) that transmit downlink (DL) signals to, and receive uplink (UL) signals from, mobile wireless devices, or user equipment (UE). As a UE moves through the coverage area, it monitors the strength of signals received from different TRPs to help the network determine when to initiate a handover (HO) of the UE from one cell to another.

A simplified wireless communication system 100 is illustrated in FIG. 1. The system includes a UE 10 that communicates with one or more access nodes 20A, 20B using radio connections 17, 18. The access nodes 20A, 20B are connected to a core network node 30. The access nodes 20A-20B, which function as TRPs, are part of a radio access network 15.

For wireless communication systems pursuant to 3GPP 5G System, 5GS (also referred to as New Radio, NR, or 5G) standard specifications, the access nodes 20A-20B correspond typically to a 5G NodeB (gNB) and the network node 30 corresponds typically to either an Access and Mobility Management Function (AMF) and/or a User Plane Function (UPF). The gNB is part of the radio access network 15, which in this case is the NG-RAN (Next Generation Radio Access Network), while the AMF and UPF are both part of the 5G Core Network (5GC).

FIG. 2 is a schematic illustration of one embodiment of a top-level overview of nodes and interfaces in a new generation cellular communication system. The new generation radio access network (NG-RAN) comprises a number of nodes, in this embodiment gNB 20A and gNB 20B. Each NG-RAN node 20A, 20B is associated with at least one TRP. Each NG-RAN node can support one or several cells where each cell can use one or several TRXP's for transmission and reception. The Access Management Function/User Plane Function (AMF/UPF) 35 are provided in network nodes 30 of the core of the 5th generation (5GC). The AMF/UPF 35 communicates with the gNB 20A and gNB 20B via an NG interface 32. The gNB 20A and gNB 20B may communicate internally in the NG-RAN by the Xn interface 22.

Cells are typically, but not always, served by a single TRP, which transmits reference symbols that allow a UE to detect, identify, measure and report cell candidates to the network according to network configured rules.

For example, in NR systems, each TRP broadcasts a Synchronization Signal Block (SSB) which includes the Physical Cell Identity (PCI) of the cell served by the TRP and other information needed by the UE to acquire more information to access the network. The SSB provides the NR Physical Cell identity (PCI), which helps UEs in the system to identify and separate different NR Cells from each other. For example, FIG. 3 illustrates a network including two TRPs 20A, 20B that serve respective cells 22A, 22B. The TRPs each broadcast a unique SSB, namely, SSB1 and SSB2, in their respective cells. UEs in the RRC IDLE and RRC CONNECTIVE INACTIVE states are searching, synchronizing, measuring and resolving different NR Cells based on received SSB transmissions. The information obtained in such procedures is used to control cell selection/re-selection and camping on NR cells. When a UE needs to access the RAN system, it uses the Physical Random-Access Channel (PRACH) resources and configuration defined via the SSB for the NR Cell it is camping on and synchronized to.

To access a cell in the RAN, a UE typically engages in a Random Access signaling process involving four messages (MSG 1, MSG 2, MSG 3 and MSG 4), as shown in FIG. 4. MSG 1 is a preamble sent by the UE on a random access channel (RACH) associated with the cell, where RACH is the logical channel carried on the PRACH. The network responds with a random access response (MSG 2) that indicates reception of the preamble and indicates a time alignment command for adjusting the timing of transmissions by the UE. The UE then sends MSG 3, which requests setup of an RRC connection. The MSG 4 or a later DL message may contain RRC information regarding the connection configuration for the UE, when it is set up in the NR Cell where it made the access.

Handover between two cells can be divided into different time phases, such as network configuration of the UE, UE candidate search and evaluation, UE reporting to the network, target preparation, handover execution and handover completion. The network configuration, UE reporting and handover execution phases are typically performed using radio resource control (RRC) signalling. However, handover execution may also include a random-access attempt to the target cell to allow for time alignment adjustments of UE transmission time if needed.

In fourth generation (4G) systems, seamless handover and robust handover are achieved by letting two or more TRPs serve the same cell by transmitting identical and synchronized DL signals. A UE perceives such signals as originating from only one cell. This concept is called a "combined cell" for bi-directional transmission or Single Frequency Network (SFN) for downlink (DL) only transmissions. A drawback with using a combined cell or SFN, however, is that it may reduce the efficiency of the total available radio resources within the area covered by the combined cell or SFN.

Another important aspect of a mobile communication system is transmission selectivity. Being selective when transmitting, to avoid disturbing other ongoing transmissions and to enable resource re-use by not utilizing more resources than necessary so other users can use them, is a key property for achieving high capacity and optimal coverage in a cellular network with limited spectrum assets. To be selective, the network need to get support from the UE to identify the best TRP candidates to be used for DL transmissions to the UE's. The best TRP candidates to be used for reception can also be selected based on UE support.

The NR standard allows the SSB to be divided into several SSB beams, where each SSB beam can be identified by an SSB index. There is, however, a limitation for how many SSB indexes an SSB transmission can be divided into. The number depends on the orthogonal frequency-division multiple access (OFDMA) subcarriers spacing used for the transmission. For NR capable UE's, current UE support to detect and distinguish multiple TRP's using SSB index within the same cell is limited to 4 SSB indexes per SSB transmission when the subcarrier spacing (SCS) is 15 kHz. A maximum of 4 SSB indexes allows only up to 4 beams to be uniquely identified by UE.

SUMMARY

A network node according to some embodiments includes a processing circuitry and a memory, said memory containing instructions executable by said processing circuitry whereby said network node may be operative to receive, at a first transmission/reception point, TRP, a random access request from a wireless device on a random access channel of a first cell associated with the first TRP, and transmit, from the first TRP, a synchronization signal block, SSB, equivalent indication to the wireless device, wherein the SSB equivalent indication corresponds to a second cell.

A method of establishing a connection between a wireless device and a wireless communication network according to some embodiments includes receiving, at a first transmission/reception point, TRP, a random access request from the wireless device on a random access channel of a first cell associated with the first TRP, and transmitting, by the first TRP, a synchronization signal block, SSB, equivalent indication to the wireless device, wherein the SSB equivalent indication corresponds to a second cell.

The method may further include transmitting, by the first TRP, a first SSB associated with the first TRP, and transmitting, by the first TRP, a second SSB, wherein the second SSB may be associated with the second cell.

Transmitting the SSB equivalent indication may be performed in response to receiving a radio resource control, RRC, connection request from the wireless device. Transmitting the SSB equivalent indication may include transmitting the SSB equivalent indication to the wireless device in an RRC connection setup message.

The second cell may be a multiple-TRP cell encompassing the first cell and a third cell. The SSB equivalent indication may correspond to the multiple-TRP cell. The SSB equivalent indication may include a master information block, MIB, that contains information for accessing the second cell. The SSB equivalent indication may encode a physical cell identity, PCI, of the second cell.

The second SSB may configure the second cell as unavailable for camping. The second SSB may configure the second cell as unavailable for camping by not transmitting a system information block 1, SIB1, on a downlink shared channel associated with the second cell. The second SSB may configure the second cell as unavailable for camping by not including a tracking area code, TAC, information element in a system information block 1, SIB1, on a downlink shared channel associated with the second cell.

The method may further include transmitting a random access response to the wireless device in response to the random access request, and receiving a connection request from the wireless device in response to the random access response, wherein transmitting the SSB equivalent to the wireless device may include transmitting the SSB equivalent to the wireless device in response to the connection request.

Transmitting the SSB equivalent indication may include transmitting the SSB equivalent indication in a connection reply in response to the connection request received from the wireless device.

Transmitting the SSB equivalent indication may include transmitting the SSB equivalent in a radio resource control connection configuration message.

The second cell may include a multiple-TRP cell that is defined in that at least two TRPs transmit identical synchronization signal blocks at a same time and frequency so that the wireless device perceives it to represent a same synchronization signal block.

SSBs defining the multiple-TRP cell transmitted from different TRPs may include the same physical cell identity of the multiple-TRP cell.

The first SSB and the second SSB may be transmitted concurrently and/or interleaved in time, wherein the first SSB and the second SSB may be superimposed on top of each other, using at least one common resource element, wherein the first SSB and the second SSB may be transmitted on different frequency carriers, and/or wherein the first SSB and the second SSB may be transmitted in different time slots.

The method may further include receiving SSB configuration data from a NG-RAN node defining the first and second SSBs, wherein transmitting the first SSB and the transmitting the second SSB may be performed according to the received SSB configuration data.

Some embodiments provide a computer program including instructions, which when executed by at least one processor, cause the at least one processor to perform operations of receiving, at a first transmission/reception point, TRP, a random access request from the wireless device on a random access channel of a first cell associated with the first TRP, and transmitting, by the first TRP, a synchronization signal block, SSB, equivalent indication to the wireless device, wherein the SSB equivalent indication corresponds to a second cell. Some embodiments provide a computer-program product including a non-transitory computer-readable medium having the computer program stored thereon.

A wireless device according to some embodiments includes a processing circuitry and a memory, said memory containing instructions executable by said processing circuitry whereby said wireless device may be operative to transmit a random access request to a first transmission/reception point, TRP, of a wireless telecommunication system on a random access channel indicated in a first synchronization signal block, SSB, transmitted by the first TRP, wherein the first SSB defines a first cell that may be associated with the first TRP, and receive, from the first TRP, an SSB equivalent indication in response to the random access request, the SSB equivalent indication corresponding to a second cell.

A method of operating a wireless device according to some embodiments includes transmitting a random access request to a first transmission/reception point, TRP, of a wireless telecommunication system on a random access channel indicated in a first synchronization signal block, SSB, transmitted by the first TRP, wherein the first SSB defines a first cell that may be associated with the first TRP, and receiving, from the first TRP, an SSB equivalent indication in response to the random access request, the SSB equivalent indication corresponding to a second cell.

The method may further include receiving the first SSB from the first TRP, and receiving a second SSB from the first TRP, wherein the second SSB defines the second cell. The second cell may be a multiple-TRP cell that encompasses the first cell and a third cell. The SSB equivalent indication may include a master information block, MIB, that contains information for accessing the second cell. The SSB equivalent indication may encode a physical cell identity, PCI, of the second cell.

The second SSB may configure the multiple-TRP cell as unavailable for camping. The second SSB may configure the second cell as unavailable for camping by not transmitting a system information block 1, SIB1, on a downlink shared channel associated with the second cell. The second SSB may configure the second cell as unavailable for camping by not including a tracking area code, TAC, information element in a system information block 1, SIB1, on a downlink shared channel associated with the second cell.

The method may further include receiving a random access response, and transmitting a connection request to the first TRP in response to the random access response, and receiving the SSB equivalent indication may include receiving the SSB equivalent indication in response to the connection request.

Receiving the SSB equivalent indication may include receiving the SSB equivalent indication in a connection reply in response to the connection request. Receiving the SSB equivalent indication may include receiving the SSB equivalent in a radio resource control connection configuration message.

The multiple-TRP cell may be defined in that at least two TRPs transmit identical synchronization signal blocks at a same time and frequency so that the wireless device perceives it to represent a same synchronization signal block. SSBs defining the multiple-TRP cell transmitted from different TRPs include the same physical cell identity of the multiple-TRP cell.

The first SSB and the second SSB may be received concurrently and/or interleaved in time, wherein the first SSB and the second SSB may be superimposed on top of each other using at least one common resource element, wherein the first SSB and the second SSB may be received on different frequency carriers, and/or wherein the first SSB and the second SSB may be received in different time slots.

A computer program including instructions, which when executed by at least one processor, cause the at least one processor to perform operations of transmitting a random access request to a first transmission/reception point, TRP, of a wireless telecommunication system on a random access channel indicated in a first synchronization signal block, SSB, transmitted by the first TRP, wherein the first SSB defines a first cell that may be associated with the first TRP, and receiving, from the first TRP, an SSB equivalent indication in response to the random access request, the SSB equivalent indication corresponding to a second cell. A computer-program product may include a non-transitory computer-readable medium having the computer program stored thereon.

Some potential advantages of the systems/methods described herein are that each TRP in a multiple-TRP cell can have a unique PRACH resource. The amount of resources used for PRACH in the system do not have to increase when multiple-TRP NR cell deployment is used. Such resources can instead be used for other purposes.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
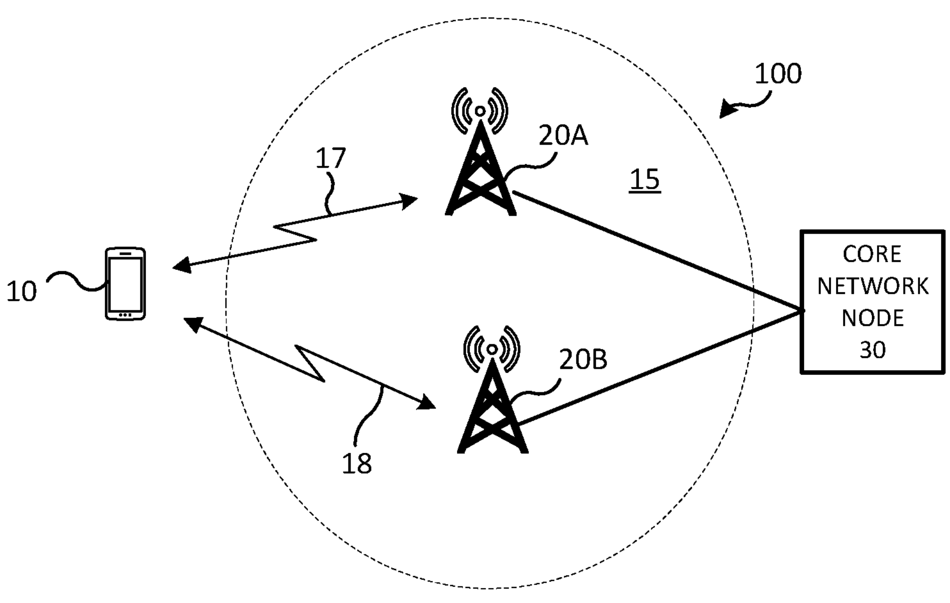
FIG. 1 is a schematic illustration of a wireless communication system.
Figure 2:
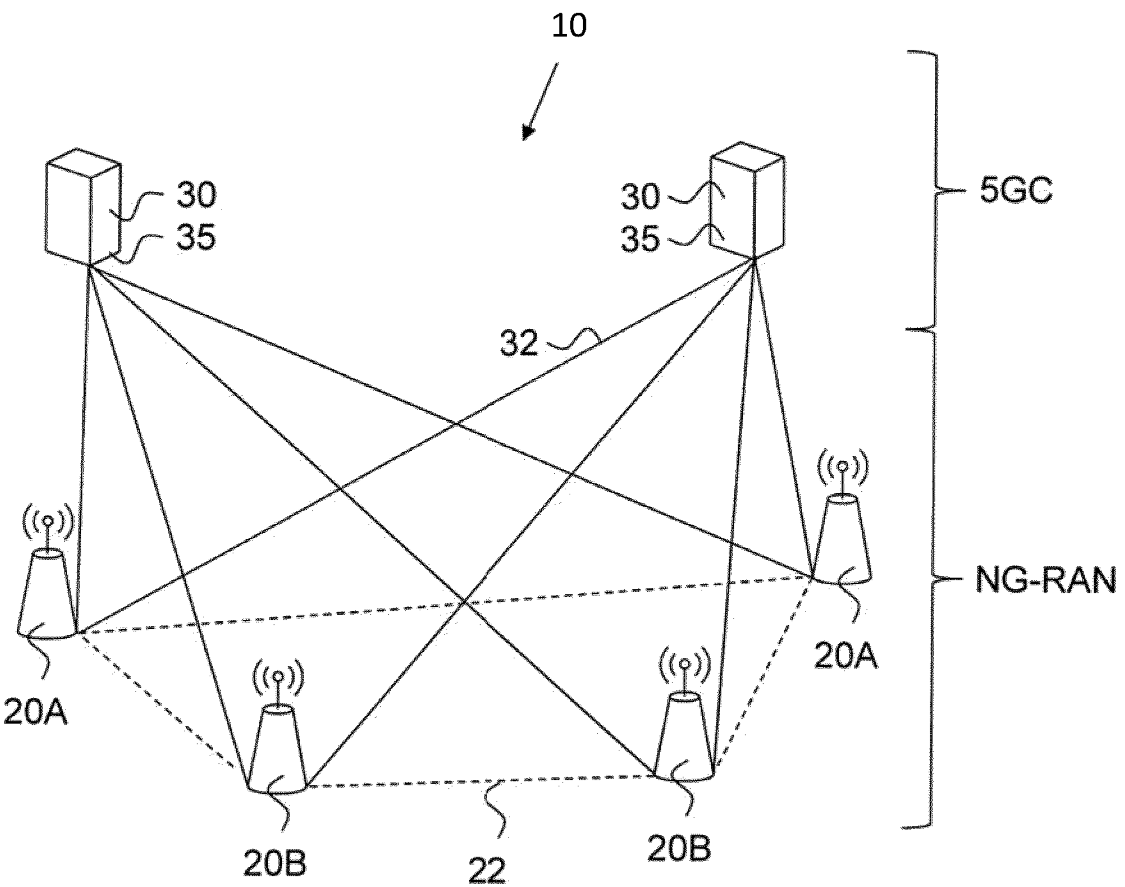
FIG. 2 is a schematic illustration of a top-level overview of nodes and interfaces in a new generation cellular communication system.
Figure 3:
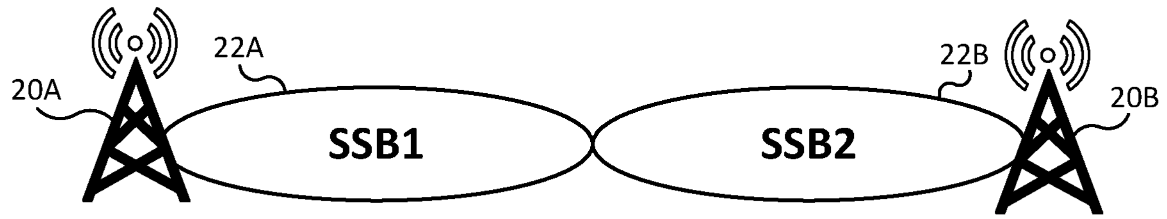
FIG. 3 illustrates two transmit/receive points with associated cells.
Figure 4:
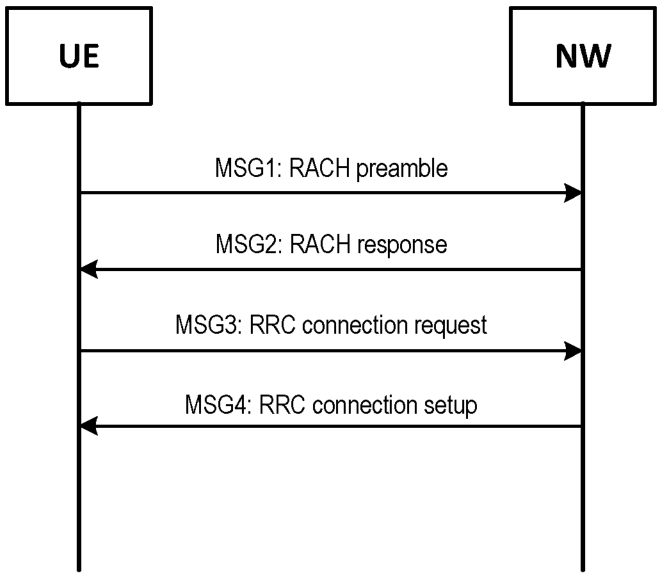
FIG. 4 illustrates a random access procedure for accessing a cell.
Figure 5:
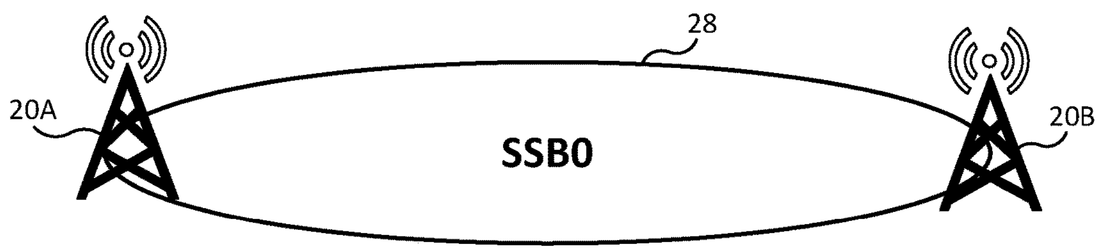
FIGS. 5-7 illustrate multiple-TRP cell configurations.

As noted above, the 3GPP NR specification supports multiple TRPs serving a single NR cell. For example, as shown in FIG. 5, both TRPs 20A, 20B transmit SSB0 that defines a single multiple-TRP cell 28. The use of multiple-TRP cells can be beneficial from an operator management point of view when the number of TRPs increase in the network. The use of multiple-TRP cells can also provide certain performance enhancements, such as transmission diversity, DU-MIMO, improved mobility (seamless Layer 2 mobility), etc. If each TRP defines a unique NR cell, then each TRP must have its own PRACH resources. However, if multiple TRPs represent a common cell, those TRPs need to share a single PRACH resource. This may limit the uplink access capacity for a multiple-TRP NR Cell.

Figure 6:
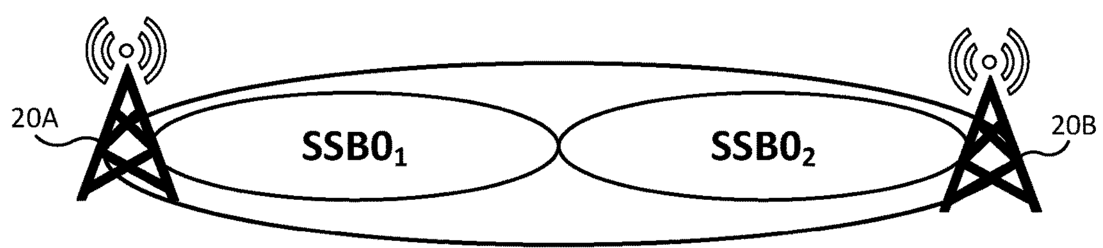

To address this problem, the 3GPP specification supports SSB indexing, that is, the use of SSBs with the same PCI but with an index difference. This scenario is shown in FIG. 6, in which TRP 20A transmits SSB01 (or SSB0 with index 1) and TRP 20A transmits SSB02 (or SSB0 with index 2). Since these SSBs share the same PCI, a UE knows that these SSBs represent the same NR Cell. One benefit of this approach is that each SSB_index can point to its own unique PRACH resource in the same way as if it is different NR Cells. Thereby, the PRACH capacity problem is addressed for multiple-TRP NR Cells.

Figure 7:
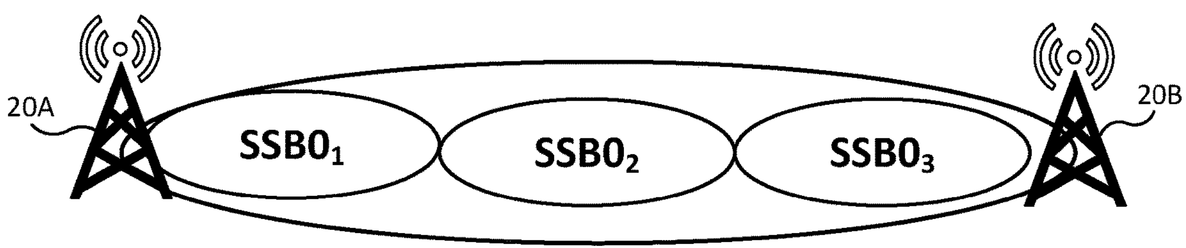

However, one problem with the SSB index approach is that it is only possible to have a limited number of SSB_indexes per PCI (NR Cell). If a multiple-TRP NR Cell should contain more TRPs than the number of possible SSB_indexes it is not possible to achieve the same PRACH capacity as it if each TRP were associated with a unique NR Cell, unless a re-use and SSB_index planning is applied such as shown in FIG. 7, which complicates the operator deployment efforts.

Another problem is that introduction of SSB indexing increases the operator deployment complexity. System deployment planning requires a mixture of SSBs planning, and then additionally for some cells an SSB_index planning needs to be applied, which increases deployment complexity.

An additional problem is that for common search space downlink control information (DCI) formats, the transmissions cannot be UE specific (e.g. msg 2, msg4, SIB, paging), as collective RNTI and PCI values are used for the scrambling. The result is that neighboring TRPs in a multiple-TRP cell cannot freely schedule the common search space DCI formats since it would cause collisions and/or inability for the UE to separate transmissions from different TRPs. Scheduling coordination between the TRPs is then required, which both complicates the scheduler and limits the air-interface resource re-use.

Some embodiments provide systems/methods for establishing a connection between a wireless device and a wireless communication network that may overcome one or more of these problems. In particular, in some embodiments, a first TRP first TRP transmits a first SSB corresponding to a first cell and a second SSB corresponding to a second cell. The second cell may be a multiple-TRP cell is served by more than one TRP. In some embodiments, the multiple-TRP cell may encompass the first cell and a third cell associated with a second TRP. In some embodiments, the first TRP receives a random access request from the wireless device on a random access channel of the first cell. In response, the first TRP transmits a SSB equivalent indication to the wireless device, wherein the SSB equivalent indication corresponds to the second cell. The first TRP establishes the connection with the wireless device based on the SSB equivalent indication.

In some embodiments, a conventional SSB is used to identify each TRP in a multiple-TRP cell. That is, in some embodiments, a TRP may broadcast a multiple-TRP SSB in addition to a unique SSB on the same sector carrier that identifies a TRP-specific cell. When the UE accesses the system using a random access procedure on the TRP-specific cell, the system includes an SSB-equivalent in the MSG4 message. This provides an indication that the UE is connected to the system and that UE random access contention is resolved, but instead of establishing an RRC connection with the TRP-specific cell it used for access, the UE is instead connected to the multiple-TRP cell identified by the SSB-equivalent. As an alternative, an RRC reconfiguration message may be used to make the UE use a conventional Layer 3 handover access to the multiple-TRP cell on separate PRACH resources.

In further embodiments, a TRP may broadcast a first and second unique SSBs that identify first and second TRP-specific cells on the same sector carrier. When the UE accesses the system using a random access procedure on the first TRP-specific cell, the system includes an SSB-equivalent in the MSG4 message that is associated with the second TRP-specific cell. Instead of establishing an RRC connection with the first TRP-specific cell it used for access, the UE is instead connected to the second TRP-specific cell identified by the SSB-equivalent.

Some potential advantages of the systems/methods described herein are that each TRP can have a unique PRACH resource independent of whether the TRP represents a single TRP NR cell or is part of an overlayed multiple-TRP cell. The amount of resources used for PRACH in the system do not have to increase when multiple-TRP NR Cell deployment is used. These resources can instead be used for other purposes.

Second, the operator may not need to handle a mix or SSBs or SSB_indexes in its network deployment if deploying multiple-TRP NR Cells.

Third, in some embodiments, the limitation on the number of available SSB indexes, which limits the number of TRPs that a multiple-TRP NR Cell can support, may be obviated.

Fourth, when the UE is camping and accessing single TRP NR Cells according to some embodiments, the common search space DCI format transmissions (paging, initial requests etc.) are single TRP Cell oriented. This may decrease the need for TRP scheduling coordination. That is, systems/methods according to some embodiments may simplify the scheduler design and/or improve the air-interface efficiency for multiple-TRP NR Cells.

In some embodiments, a TRP transmits multiple SSBs concurrently in a same sector carrier. Systems/methods for concurrently transmitting multiple SSBs will now be described with reference to FIG. 8 and FIGS. 9A-9F.

In NR, the physical cell identity (PCI) is communicated to the UE via a primary synchronization signal (PSS) and a secondary synchronization signal (SSS). The PSS can assume the values 0,1,2 and the SSS can independently assume the values 0, . . . , 335. In other words, by combining the PSS and the SSS values it is possible for a UE to identify one out of 1008 unique SSBs/PCIs. Accordingly, the network may use the SSB frequency and the PCI to identify different Cells/TRPs.

Furthermore, by transmission of more than one SSB from a TRP, more than one cell associated with the TRP can be identified. These cells can be configured independently of each other. This means that by transmitting two different SSBs, a single TRP can be associated with a cell that is unique for the TRP in question, and at the same time be associated with a combined cell, common for the TRP in question and one or more neighboring cells.

Figure 8:
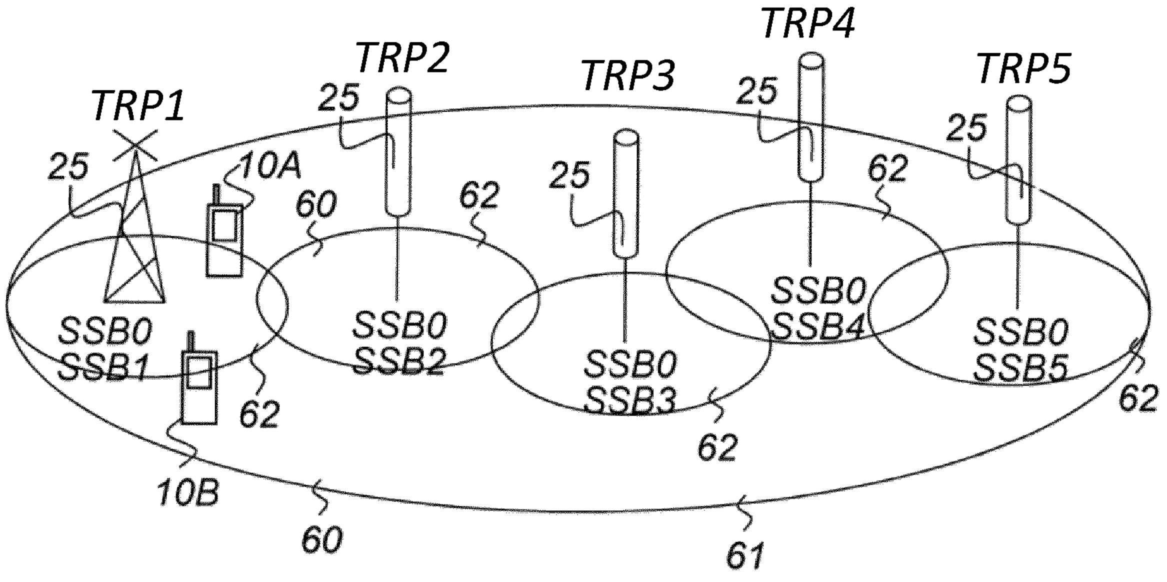
FIG. 8 is a schematic illustration of an embodiment of co-existing single-TRP cells and multiple-TRPX cells.

An example of a cell configuration is illustrated schematically in FIG. 8. Five TRPs 25 are present within an area. Each TRP 25 transmits a unique SSB, SSB1-SSB5, which defines a cell 62 that is associated with a single TRP 25 In this example, all TRPs 25 in the area can transmit an additional SSB, SSB0, thereby defining a multiple TRP cell 61 (or an SFN cell). In the area, the UEs 10A, 10B experiences that there are six cells 60; five single TRP cells 62 and one combined (multiple-TRP) cell 61. Preferably, the network has configured SSB0 for a cell configured to be indicated as not available for idle or inactive mode camping to the UE's. In such an embodiment, the UE 10A, 10B will do cell reselection in idle/inactive mode only between SSB1-SSB5.

Paging reception and initial Random Access attempts will typically also only be done using Cells 62 represented by SSB1-SSB5. Once the UE and the network have setup an RRC connection, the network may or may not reconfigure the UE. Consider the first UE 10A in FIG. 8. The UE 10A detects signals comprising SSB0, SSB1 and weaker signals comprising SSB2. Since the SSB0 is configured not to be used for random access, an RRC connection is established with TRP1 based on the SSB1. The UE 10A is more or less stationary but requires Mobile Broadband communication. The network thereby chooses to let the UE 10A stay in the single TRP cell 62 associated with TRP1.

Another UE 10B is also connected to the TRP1 based on the SSB1. The UE 10B only requires voice communication, i.e. the required band width is rather limited. However, the UE 10B is expected to move and requires a continuous connection without any interruptions. The network may therefore select to handover the UE 10B to the combined cell 61 defined by the SSB0. This reduces the risks for disconnections during any repeated mobility related handover procedures.

From these examples, a method for cell assignment can be expressed. The method comprises selection of a cell intended for a UE out of at least a first cell and a second cell. The first cell is unique for a first TRP. The second cell is a combined cell of the first TRP and at least one neighboring, second TRP. The method further comprises assignment of the selected cell to the UE.

The combined cell may be defined in that at least two TRPs transmit identical SSBs at a same time and frequency so that a UE perceives it to represent the same SSB. In some embodiments, the selection of a cell is performed dependent on needs and capabilities of the UE. The first cell may be selected if the UE requires Mobile Broadband communication. The first cell may be selected if the UE requires communication of non-real-time video or image data. The second cell may be selected if communication with the UE is reliability sensitive. The second cell may be selected if the UE requires voice communication, real-time video communication, interactive gaming communication or communication of latency-sensitive control communication.

With the multi TRP SSB deployment it is thus possible to configure the connections individually per UE, adapted to respective needs and capabilities, in the same area. A UE can be configured to the single SSB per TRP where handover between TRP's then are performed. A UE can be configured to the combined cell type of SSB where multiple TRPs are a single cell. Thereby the robust and RRC signalling free and seamless handover between TRPs can be achieved for this UE, at the expense of capacity i.e. as in a legacy SFN combined cell.

These possibilities are thus based on the provision of more than one SSB from a single TRP. In some embodiments, first SSBs are transmitted at a sector carrier. The transmission is performed from a first TRP of a cellular telecommunication system. The first SSBs define a first cell. This cell is unique for the first TRP. Second SSBs are also transmitted at the sector carrier. The transmission is performed from the same first TRP. The second SSBs define a second cell. The second cell is a combined cell of the first TRP and at least one neighboring, second TRP.

The combined cell may be defined in that at least two TRPs transmit identical SSBs at a same time and frequency so that a UE perceives it to represent a same SSB.

As mentioned briefly above, the SSB may include, and thereby be identified by, a PCI. In other words, the first SSBs comprise a PCI of the first cell and the second SSBs comprise a PCI of the second cell. SSBs defining the second cell transmitted from different TRPs include the same PCI of the second cell.

In some embodiments, the PCI comprises a PSS and an SSS. This allows a UE to support the TRP selection by blind detection and measurements of many unique SSBs. For NR, 1008 SSBs are available.

The first SSBs and second SSBs may be transmitted concurrently and/or interleaved in time. In a case where two different SSBs are to be transmitted from a TRP, there are four main alternatives of arrangements. The different types of SSB transmission from multiple TRP's are to allow one transmission to be perceived as e.g. SFN combined and the other to be perceived as unique per TRP.

Figures 9A, 9B, 9C, 9D, 9E, 9F:
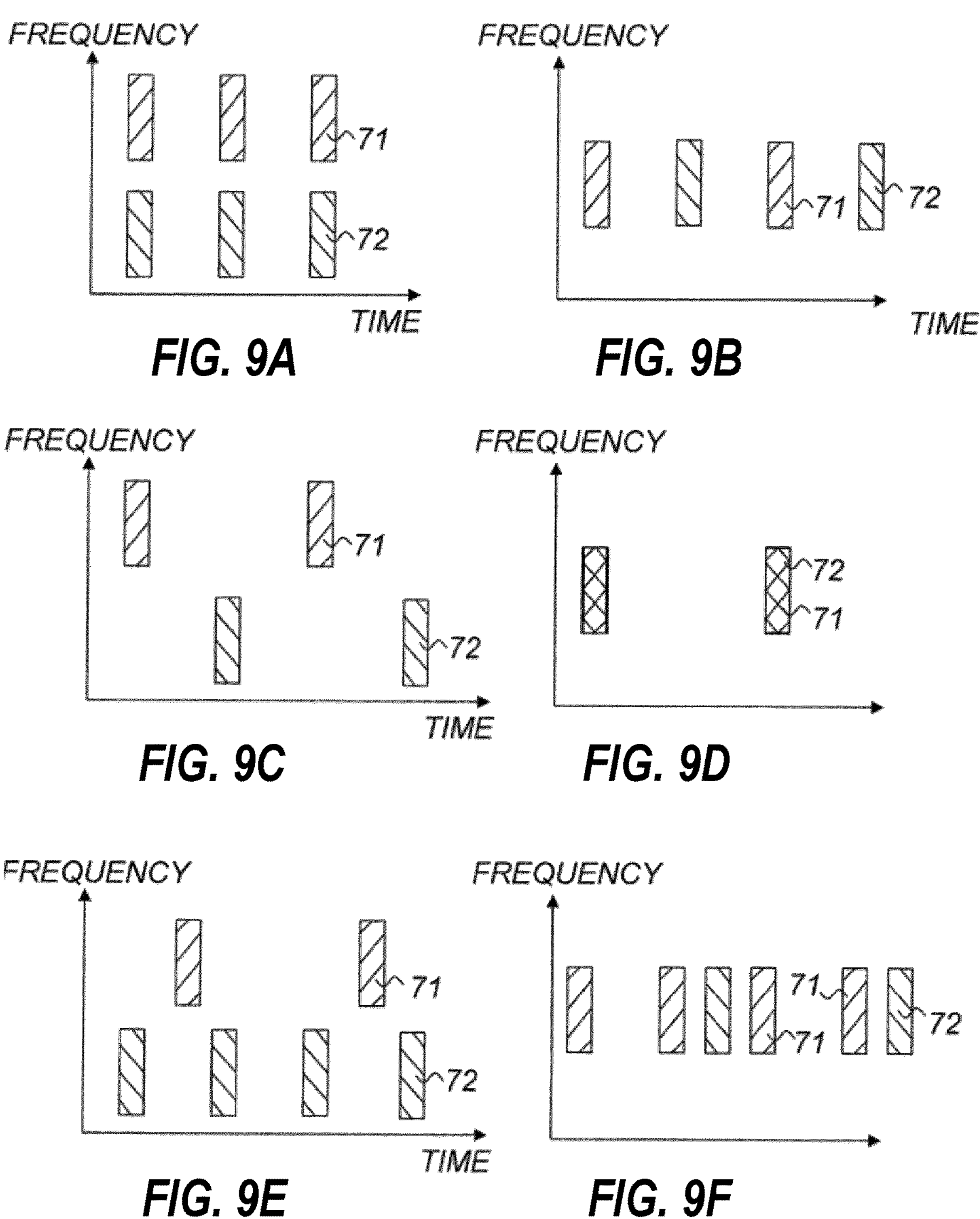
FIGS. 9A-D illustrate examples of distribution of SSBs in a frequency/time space.
FIGS. 9E-F illustrate examples of distribution of SSBs with differing periodicity.

FIG. 9A illustrates schematically an embodiment where the SSB transmissions are separated in frequency. A first SSB 71 is transmitted in one subcarrier and a second SSB 72 is transmitted in another non-overlapping sub carrier. The two types of SSB transmissions are in this embodiment transmitted at the same time. A UE will thus perceive this situation as Inter frequency cells. In other words, in one embodiment, first SSBs are provided at a different frequency compared to second SSBs.

FIG. 9B illustrates schematically an embodiment in which the SSB transmissions are separated in time. The first SSB 71 and the second SSB 72 use overlapping sub carriers but transmit the two types of SSB transmissions at different non-overlapping times. A UE will perceive this as Intra frequency non time aligned cells. In other words, in one embodiment, first SSBs are provided at a different time slot compared to second SSBs.

FIG. 9C illustrates schematically yet another embodiment, in which the SSB transmissions are separated in both time and frequency. The first SSB 71 and the second SSB 72 use non-overlapping sub carriers for the transmission and transmit the two types of SSB transmissions at different non-overlapping times. A UE will perceive this as Inter frequency non time aligned cells. In other words, in one embodiment, first SSBs are provided at a different time slot as well as a different frequency compared to second SSBs.

FIG. 9D illustrates schematically yet another embodiment, where both SSB transmissions 71, 72 from one TRP are superimposed on top of each other. The first SSB 71 and the second SSB 72 thus use exactly the same resource elements (RE). Preferably, if PSS/SSS is used for identification, the same RE is used for the PSS/SSS transmission comprising a same PSS signal but with differing SSS signals. A UE will perceive this as Intra frequency Cells. In this case the SSB transmission may need to be boosted 3 dB to allow SSB power levels to be on par with other transmission from the TRP. In other words, in one embodiment, at least one of the first SSBs and at least one of the second SSBs are superimposed on top of each other, using a same resource element.

In some embodiments, the periodicity of the SSB transmissions may also be altered. For example, in one embodiment, a time between two consecutive first SSBs is the same a time between two consecutive second SSBs. However, in alternative embodiments, the periodicity for the two types of SSB transmissions may differ.

FIG. 9E illustrates schematically an embodiment in which the SSBs 71 and 72 use different sub carriers and furthermore present different periodicity. FIG. 9F illustrates schematically an embodiment in which the SSBs 71 and 72 use the same sub carrier but use different periodicity. From these examples, a person skilled in the art realizes that there are further possible variations. The periodicity difference may also be much larger than illustrated. For instance, one SSB may be transmitted with a 15 ms periodicity and the other with a 160 ms periodicity, as currently allowed by the NR standard. In other words, in one embodiment, a time between two consecutive first SSBs is different from a time between two consecutive second SSBs.

Figure 9G:
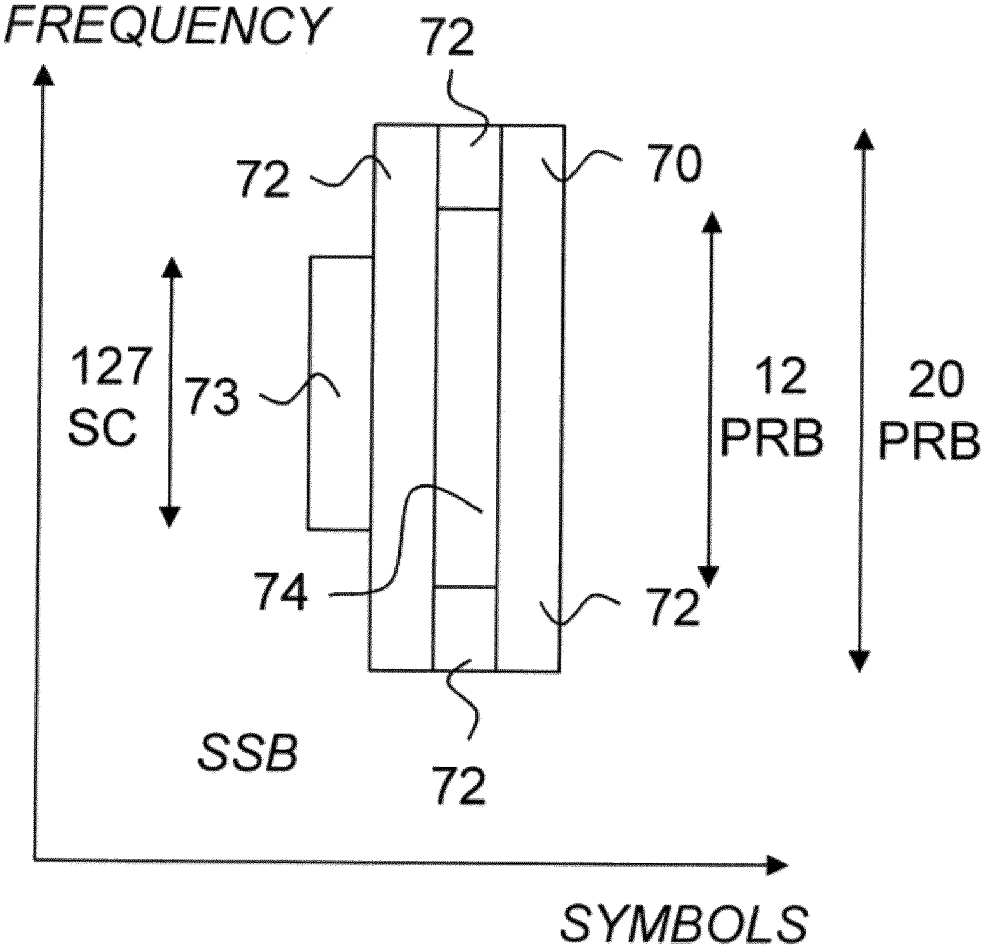
FIG. 9G is a schematic illustration of an embodiment of an SSB.

FIG. 9G illustrates an example of a structure of an SSB 70. The SSB 79 includes the PSS 73 and the SSS 74. The PSS 73 and an SSS 74 are interleaved with Physical Broadcast Channel (PBCH) signalling 72 that carries a Master Information Block (MIB). The presence of the PSS/SSS 73, 74 enables the UE to easily search and blank detect the cell, and the PBCH provides the UE with information needed to perform an initial access of the cell. The PSS 73 corresponds to 127 subcarriers and the SSS 74 occupies 12 Physical Resource Blocks (PRB), while the entire SSB 70 utilizes 20 PRB.

A UE may perform matched filtering of the PBCH to find the PSS 73. The UE may then detect the SSS in frequency domain. The PSS and SSS together indicate the physical cell ID (PCI). The UE decodes the Master Information Block (MIB) contained in the PBCH. The MIB carries some of the information needed to access the cell, such as system frame number (SFN), subcarrier spacing (SCS), the location of SIB1 resources on the physical downlink shared channel (PDSCH), etc. The remaining minimum system information (RMSI) is carried on the PDSCH in SIB1. After the UE has read RMSI from SIB1, it can perform a random access procedure to the cell associated with the PCI.

Figure 10:
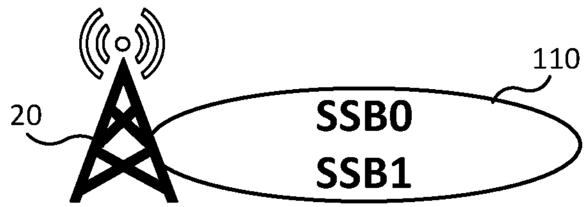
FIG. 10 illustrates a TRP that broadcasts multiple SSBs according to some embodiments.
Figure 11:
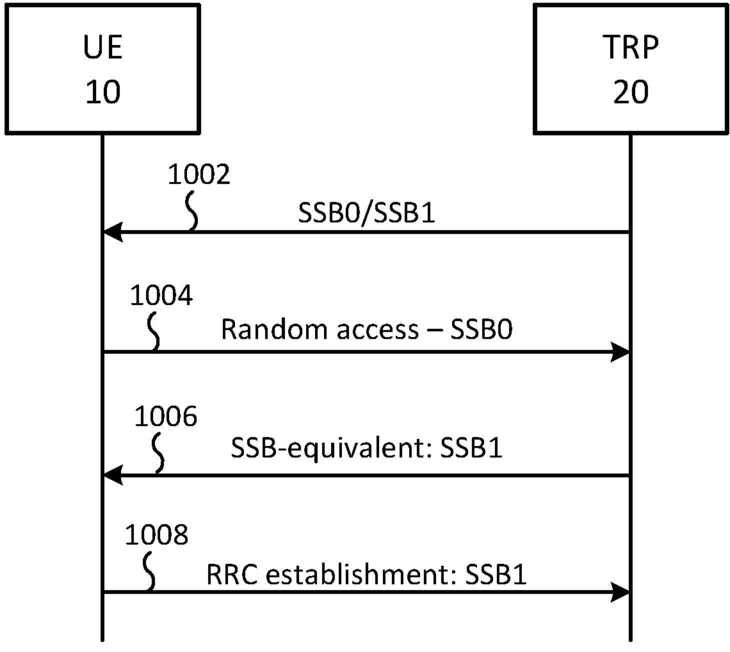
FIG. 11 illustrates a random access procedure utilizing an SSB equivalent indication according to some embodiments.

Some embodiments are illustrated in FIGS. 10 and 11. As shown therein, a TRP 20 may transmit (arrow 1002) both SSB0 defining a first cell and SSB1 defining a second cell using the same sector carrier. A UE 10 monitoring the PBCH detects SSB0 and performs a random access procedure on the cell identified by the PCI carried in SSB0 by transmitting a random access preamble (MSG1, arrow 1004) to the TRP 20. During or after the random access procedure, the TRP 20 transmits an SSB equivalent indication 1006 to the UE 10. The SSB equivalent indication identifies the PCI of a second cell, e.g., the cell associated with SSB1. The UE 10 then establishes an RRC connection to the second cell using the information contained in the SSB equivalent indication.

That is, although the UE 10 initiated a random access procedure with the TRP 20 based on SSB0, the RRC connection to the UE 10 is established with a different cell, namely the cell associated with SSB1. This type of cell management may be used by the TRP for purposes such as mobility control, quality of service, or other reasons.

In some embodiments, this type of cell management may be used to facilitate connection to a multiple-TRP cell. For example, when a UE initiates a random access procedure to access a TRP-specific cell, the UE may instead be connected to a multiple-TRP cell, and vice-versa.

Figure 12:
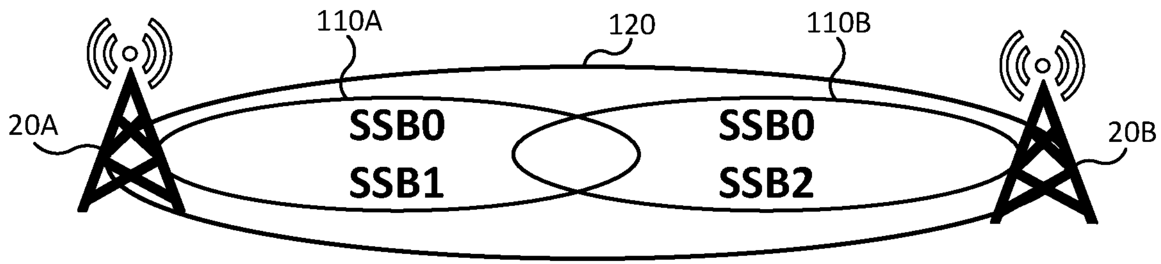
FIG. 12 illustrates a multiple-TRP cell served by TRPs that broadcast multiple SSBs according to some embodiments.

For example, as discussed above, in a multiple-TRP NR cell, each TRP in the cell transmits the same SSB, which represents a single NR cell to the UEs in the system. According to some embodiments, each TRP can also transmit an additional TRP-specific SSB which identifies an additional cell to the UE. Accordingly, as shown in FIG. 12, each TRP may broadcast two SSBs associated with two cells on the same sector carrier. For example, a first TRP 20A may broadcast a TRP-specific SSB (SSB1) and also a multiple-TRP SSB (SSB0). Likewise, a second TRP 20B may broadcast a TRP-specific SSB (SSB2) and also the multiple-TRP SSB (SSB0). The TRP-specific SSB1 is associated with a single-TRP cell 110A served by TRP 20A, while the TRP-specific SSB2 is associated with a single-TRP cell 110B served by TRP 20B. The multiple-TRP SSB (SSB0) is associated with a multiple-TRP cell 120.

For a UE, all these SSBs identify different NR cells. That is, a UE would have no knowledge about any of their relation to the TRPs.

Figure 13:
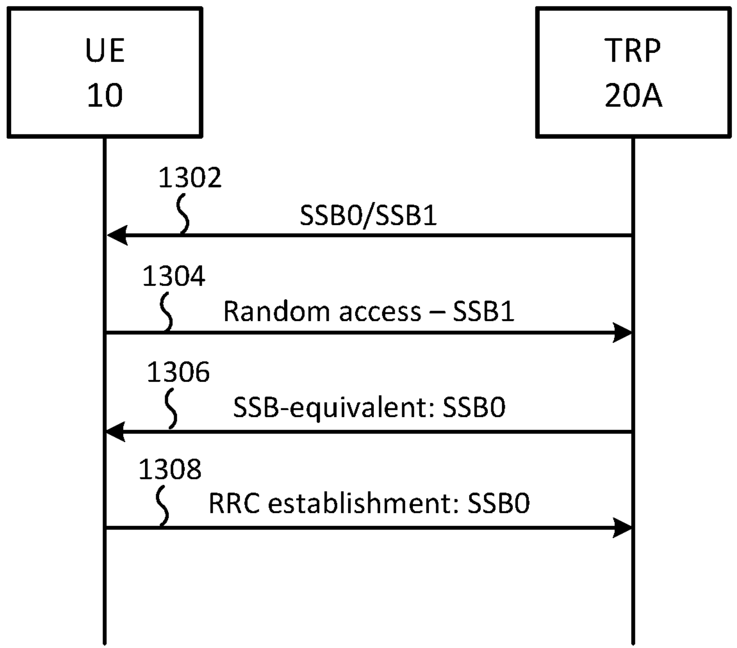
FIGS. 13 and 14 illustrate random access procedures utilizing an SSB equivalent indication according to some embodiments.

Referring to FIGS. 12 and 13, a TRP 20A may transmit (arrow 1302) both SSB1 defining the TRP-specific cell 110A and SSB0 defining the multiple-TRP cell 120 using the same sector carrier. A UE 10 monitoring the PBCH detects SSB1 and performs a random access procedure on the cell identified by the PCI carried in SSB1 by transmitting a random access preamble (MSG1, arrow 1304) to the TRP 20A. During or after the random access procedure, the TRP 20A transmits an SSB equivalent indication 1306 to the UE 10. The SSB equivalent indication identifies the PCI of the multiple-TRP cell 120, e.g., the cell associated with SSB0. The UE 10 then establishes an RRC connection to the multiple-TRP cell 120 using the information contained in the SSB equivalent indication.

In some embodiments, to help ensure that system PRACH capacity is not impacted by multiple-TRP NR Cell deployment, the network may configure the multiple-TRP NR Cell 120 as not campable (i.e., not possible to be camped on) either by not transmitting SIB1 or by not providing the tracking area code (TAC) information element in SIB 1, while the single TRP NR cells should be available to be camped on. Accordingly, UEs in RRC IDLE and RRC CONNECTED INACTIVE modes will camp on the single TRP NR cells and access the system using the resources and configuration defined for respective single TRP NR cell (in the same way as if the multiple-TRP NR Cell did not exist).

Figure 14:
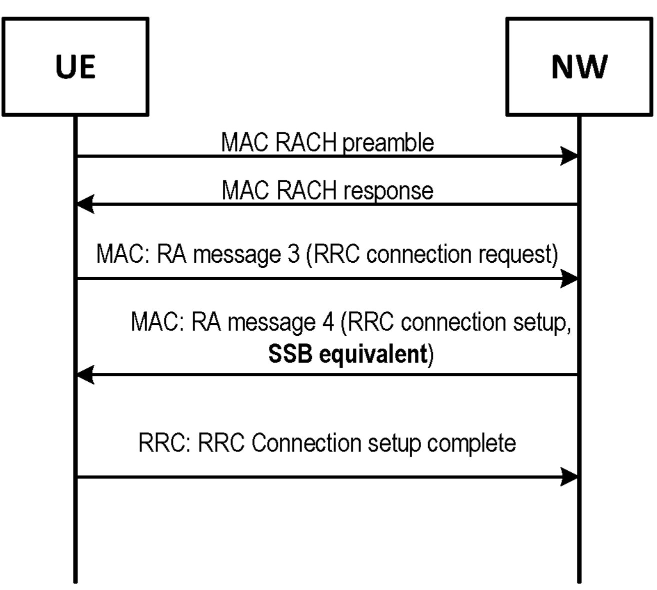

FIG. 14 illustrates a random access procedure according to some embodiments. As shown therein, when a UE accesses a network (NW) based on an SSB associated with one cell (e.g., a TRP-specific cell), the network includes in the MSG4 response an SSB equivalent indication identifying a different cell (e.g., a multiple-TRP cell). In other embodiments, the SSB equivalent indication may be provided in an RRC connection reconfiguration message following completion of the random access procedure.

As a result, the UE 10 becomes connected to the NR cell identified by the SSB equivalent indication (e.g., the multiple-TRP cell) and not the NR cell to which it made the initial access (e.g., the TRP-specific cell). It will be appreciated that the UE can initially consider all radio conditions valid for the NR cell to which it made access to be valid for the NR cell to which it becomes connected (i.e., to the cell identified in the SSB equivalent indication). This is a valid assumption, because the SSBs are transmitted on the same sector carrier and from the same TRP.

Figure 15:
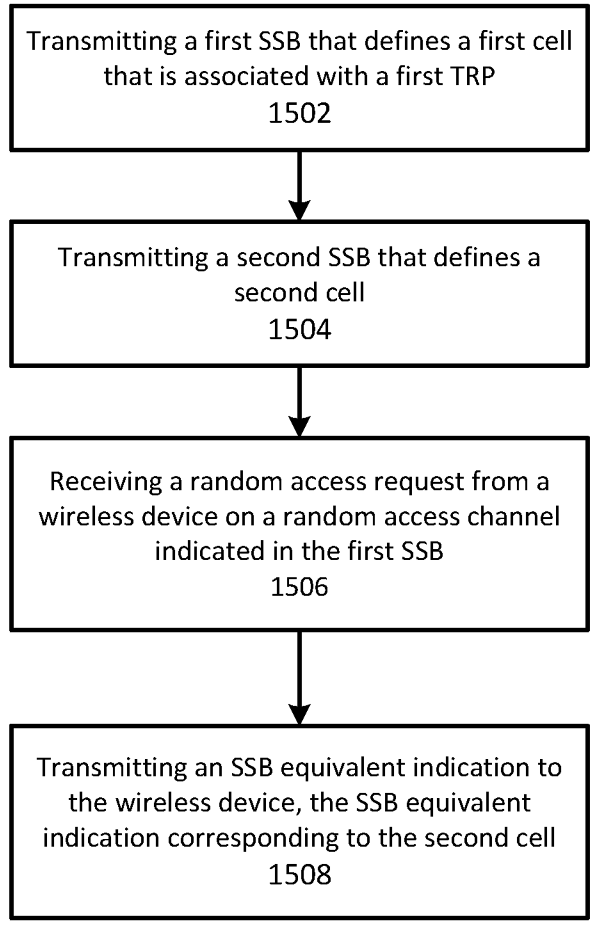
FIG. 15 is a flowchart of operations that can be performed by a TRP according to some embodiments.

FIG. 15 illustrates operations of systems/methods for establishing a connection between a wireless device and a wireless communication network. As shown therein, a first TRP transmits (block 1502) a first SSB that defines a first cell and transmits (block 1504) a second SSB that is associated with the second cell. That is, the first SSB encodes a PCI associated with the first cell and the second SSB encodes a PCI associated with the second cell. The TRP receives (block 1506) a random access request from the wireless device on a random access channel of a first cell associated with the first TRP. The first TRP transmits (block 1508) a synchronization signal block, SSB, equivalent indication to the wireless device. The SSB equivalent indication may be transmitted to the wireless device as part of a random access procedure. In particular, the SSB equivalent indication may be provided to the wireless device in a MSG4 message in response to an RRC connection request (MSG3). In some embodiments, the SSB equivalent indication may be provided to the wireless device in a radio resource control, RRC, configuration message after completion of the random access procedure.

The SSB equivalent indication corresponds to the second cell, and may include a master information block, MIB, that contains information for accessing the second cell. The first TRP then completes the connection with the wireless device based on the SSB equivalent indication.

In some embodiments, the second cell may be a multiple-TRP cell that encompasses the first cell and a third cell, as illustrated for example in FIG. 12, to which brief reference is made. For example, the TRP 20A may transmit a first SSB (SSB1) that defines a first cell 110A and a second SSB (SSB0) that defines a second cell 120. A wireless device may perform a random access procedure on a random access resource associated with the first cell 110A using information in the first SSB (SSB1). In response, the TRP 20A may transmit an SSB equivalent indication associated with the second (multiple-TRP) cell 120, and the wireless device may thereafter establish an RRC connection to the second (multiple-TRP) cell 120 based on the SSB equivalent indication.

A multiple-TRP cell, such as the second cell 120, may be defined in that at least two TRPs transmit identical synchronization signal blocks at a same time and frequency so that the wireless device perceives it to represent a same synchronization signal block.

Referring again to FIG. 15, in some embodiments, the second SSB configures the second cell as unavailable for camping, such as by not transmitting a system information block 1, SIB1, on a downlink shared channel associated with the second cell or by not including a tracking area code, TAC, information element in a system information block 1, SIB1, on a downlink shared channel associated with the second cell.

The random access request from the wireless device may include a random access preamble received on a random access channel, and the method may further include transmitting a random access response to the wireless device, receiving a connection request from the wireless device in response to the random access response, and transmitting the SSB equivalent to the wireless device in response to the connection request.

The SSB equivalent indication may be transmitted in a connection reply in response to the connection request message received from the wireless device or in a radio resource control connection configuration message.

The first SSB and the second SSB may be transmitted concurrently and/or interleaved in time. In some embodiments, the first SSB and the second SSB may be superimposed on top of each other, using at least one common resource element. In some embodiments, the first SSB and the second SSB may be transmitted on different frequency carriers. In some embodiments, the first SSB and the second SSB are transmitted in different time slots.

In some embodiments, the first TRP receives SSB configuration data from a NG-RAN node defining the first and second SSBs, and transmits the first SSB and the second SSB according to the received synchronization signal block configuration data.

Figure 16:
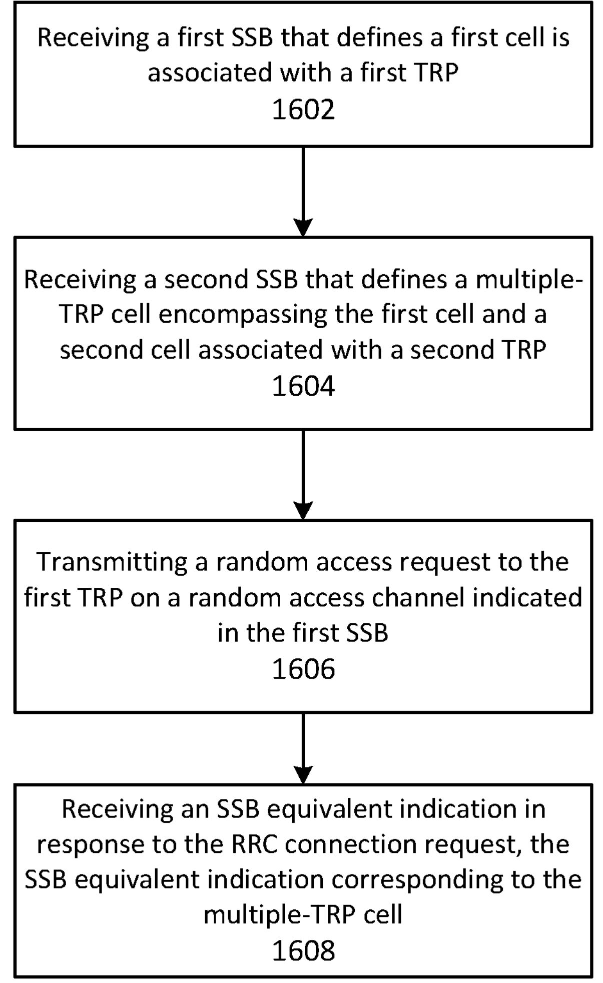
FIG. 16 is a flowchart of operations that can be performed by a wireless device according to some embodiments.

A method of operating a wireless device according to some embodiments is illustrated in FIG. 16. As shown therein, the method includes receiving (block 1602) first SSB from a first TRP of a wireless telecommunication system. The first SSB defines a first cell that is associated with the first TRP, and transmitting (block 1606) a random access request to the first TRP on a random access channel indicated in the first SSB. The wireless device receives (block 1608) an SSB equivalent indication from the first TRP in response to the random access request. The SSB equivalent indication corresponds to a second cell and may include a master information block (MIB) that contains information for accessing the second cell. The wireless device completes an RRC connection to the second cell based on the SSB equivalent indication.

The wireless device may further receive (block 1604) a second SSB from the first TRP, wherein the second SSB defines the second cell. The first SSB encodes a PCI of the first cell and the second SSB encodes a PCI of the second cell.

In some embodiments, the second SSB configures the second cell as unavailable for camping, such as by not transmitting a system information block 1, SIB1, on a downlink shared channel associated with the second cell or by not including a tracking area code, TAC, information element in a system information block 1, SIB1, on a downlink shared channel associated with the second cell.

The first SSB and the second SSB may be received concurrently and/or interleaved in time. In some embodiments, the first SSB and the second SSB may be superimposed on top of each other, using at least one common resource element. In some embodiments, the first SSB and the second SSB may be received on different frequency carriers. In some embodiments, the first SSB and the second SSB are received in different time slots.

In some embodiments, transmitting the random access request from the wireless device includes transmitting a random access preamble on the random access channel. The method may further include receiving a random access response from the first TRP, transmitting a connection request to the first TRP in response to the random access response, and receiving the SSB equivalent in response to the connection request. The SSB equivalent indication may be received in a connection reply in response to the connection request message. In some embodiments, the SSB equivalent indication may be received in a radio resource control connection configuration message.

Figure 17:
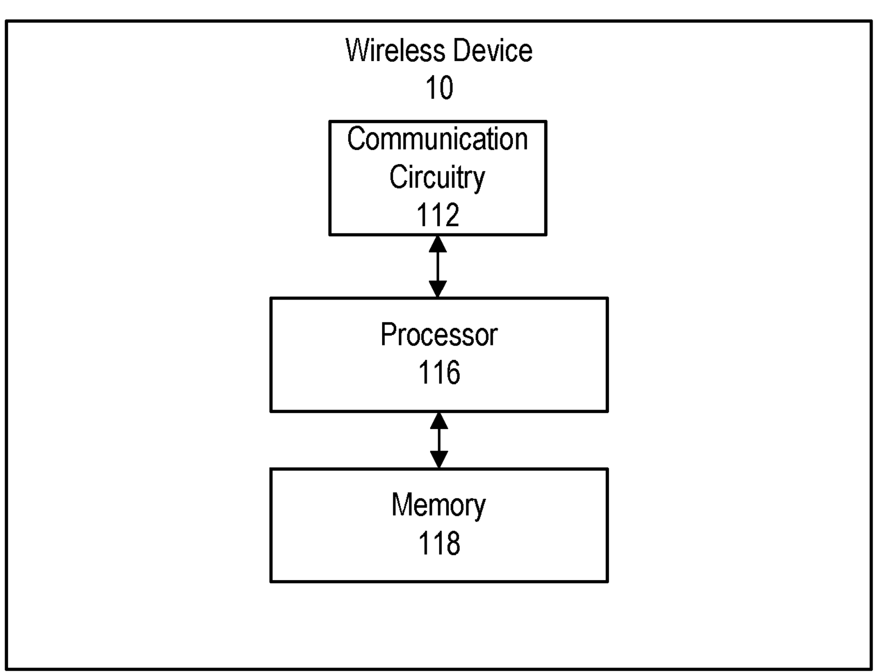
FIG. 17 is a block diagram of a wireless device according to some embodiments.

FIG. 17 depicts an example of a wireless device 10 of a wireless communication network configured to provide wireless communication according to embodiments of inventive concepts. As shown, the wireless device 10 may include a communication circuitry 112 (also referred to as a transceiver) including a transmitter and a receiver configured to provide uplink and downlink radio communications with wireless devices, such as radio access network nodes, TRPs, etc. The wireless device 10 may also include a processor circuit 116 (also referred to as a processor) coupled to the transceiver circuitry 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein.

According to other embodiments, processor circuit 116 may be defined to include memory so that a separate memory circuit is not required.

Operations of the wireless device 10 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a wireless device 10 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations described above.

Some embodiments provide computer-program product comprising a non-transitory computer-readable medium having stored thereon a computer program that, when executed by the processor 116, causes the wireless device 100 to perform operations as described herein.

Figure 18:
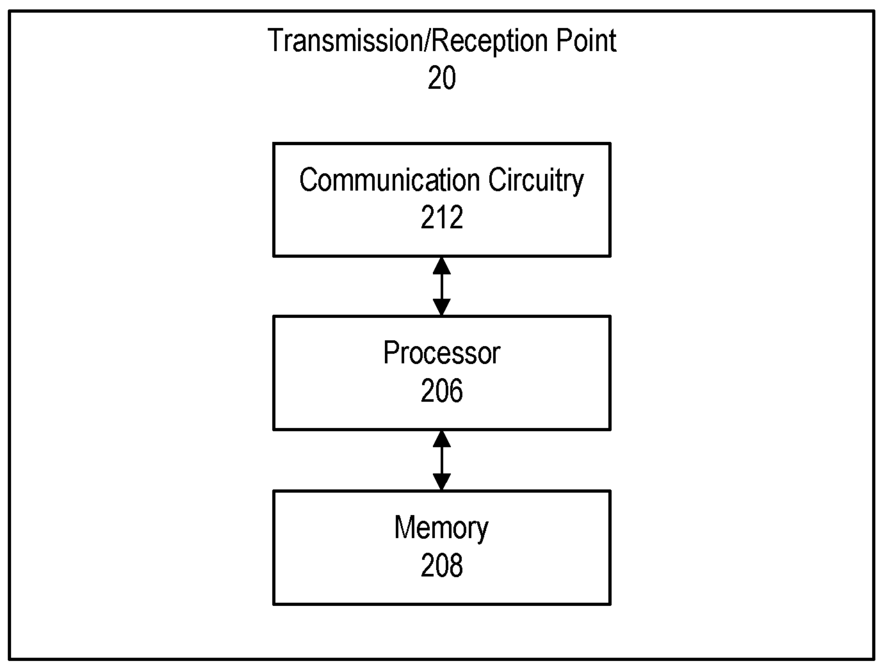
FIG. 18 is a block diagram of a TRP according to some embodiments.

FIG. 18 is a block diagram of a network node that may implement a TRP 20 according to some embodiments. As shown, the TRP 20 includes a communication circuitry 112 (also referred to as a transceiver) including a transmitter and a receiver configured to provide uplink and downlink radio communications with wireless devices. The TRP 20 further includes a processor circuit 206 and a memory 208 coupled to the processor circuit. The memory 208 includes machine-readable computer program instructions that, when executed by the processor circuit, cause the processor circuit to perform some of the operations described herein.

The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

Operations of the network node 200 may be performed by processor 206 and/or network interface 204. For example, processor 206 may control communication circuitry 212 to transmit communications through network interface 204 to one or more wireless devices. Moreover, modules may be stored in memory 208, and these modules may provide instructions so that when instructions of a module are executed by processor 206, processor 206 performs respective operations. In addition, a structure similar to that of FIG. 18 may be used to implement other network nodes. Moreover, network nodes discussed herein may be implemented as virtual network nodes.

Some embodiments provide computer-program product comprising a non-transitory computer-readable medium having stored thereon a computer program that, when executed by the processor 206, causes the TRP 20 to perform operations as described herein.

Figure 19:
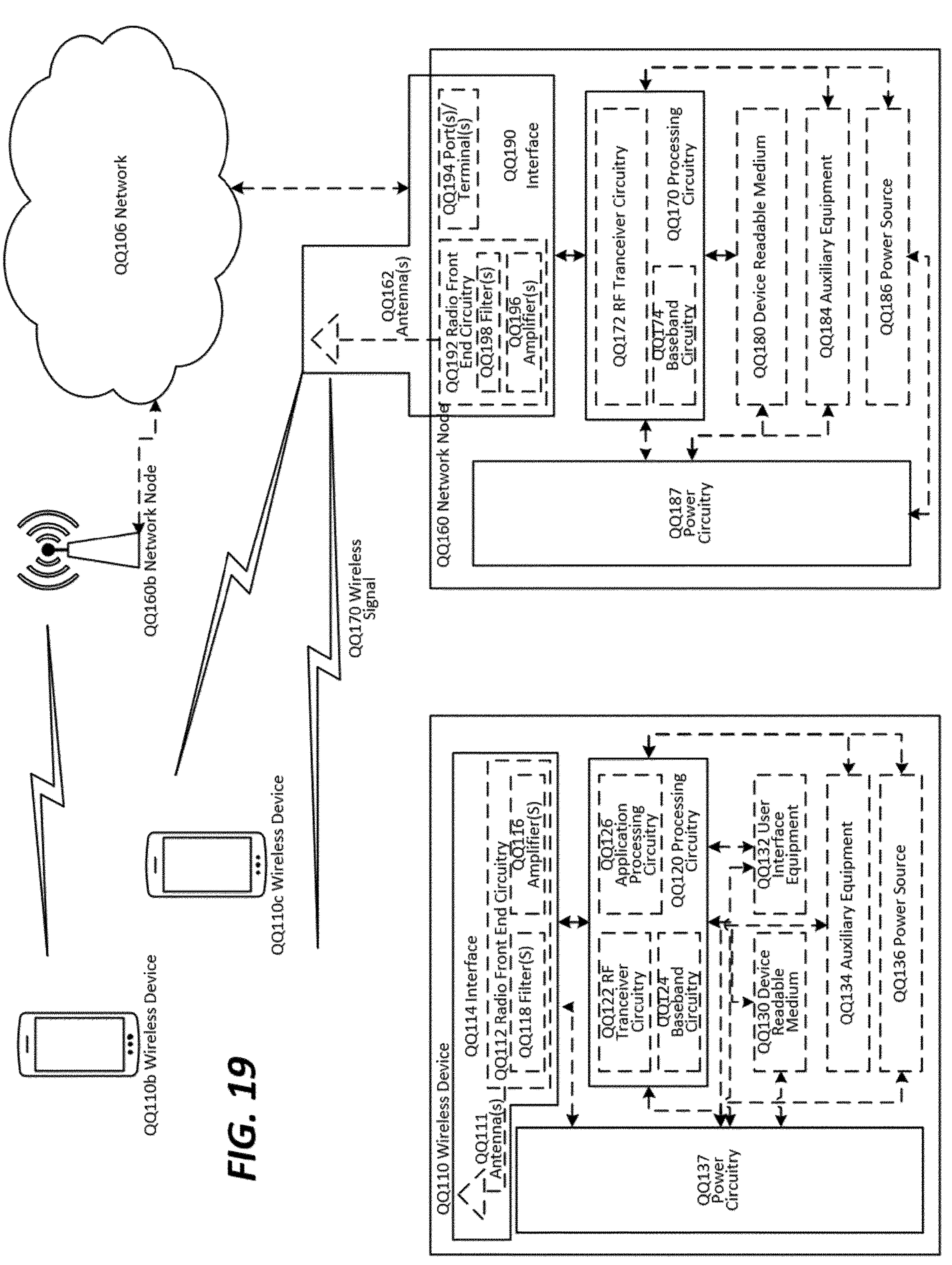
FIG. 19 illustrates elements of a wireless communication system according to some embodiments.

FIG. 19 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 19 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Further Definitions

Acronym Definition
AMF Access and Management Function
CA Carrier Aggregation
DC Dual Connectivity
DL Downlink
HO Handover
LTE Long Term Evolution
MIB Master Information Block
MIMO Multiple Input Multiple Output
NR New Radio
NW Network
OFDMA Orthogonal Frequency-Division Multiple Access
PCI Physical Cell Identity
PRACH Physical Random Access Channel
PSS Primary Synchronization Signal
RACH Random Access Channel
RAN Radio Access Network
RMSI Remaining Minimum System Information
RRC Radio Resource Control
SCS Subcarrier Spacing
SFN Single Frequency Network
SSB Synchronization Signal Block
SSS Secondary Synchronization Signal
TAC Tracking Area Code
TRP Transmission/Reception Point
UE User Equipment
UL Uplink
UPF User Plane Function

The invention claimed is:

1. A method of establishing a connection between a wireless device and a wireless communication network, comprising:

receiving, at a first transmission/reception point TRP, a random access request from the wireless device on a random access channel of a first cell associated with the first TRP; and after receiving the random access request, transmitting, by the first TRP, a synchronization signal block SSB equivalent indication to the wireless device, wherein the SSB equivalent indication corresponds to a second cell and encodes a physical cell identity (PCI) of the second cell.

2. The method of claim 1, further comprising:

transmitting, by the first TRP, a first SSB associated with the first TRP; and transmitting, by the first TRP, a second SSB, wherein the second SSB is associated with the second cell.

3. The method of claim 1, wherein transmitting the SSB equivalent indication is performed in response to receiving a radio resource control RRC connection request from the wireless device.

4. The method of claim 3, wherein transmitting the SSB equivalent indication comprises transmitting the SSB equivalent indication to the wireless device in an RRC connection setup message.

5. The method of claim 1, wherein the second cell is a multiple-TRP cell encompassing the first cell and a third cell.

6. The method of claim 5, wherein the SSB equivalent indication corresponds to the multiple-TRP cell.

7. The method of claim 2, wherein the second SSB configures the second cell as unavailable for camping.

8. The method of claim 1, further comprising:

transmitting a random access response to the wireless device in response to the random access request; and receiving a connection request from the wireless device in response to the random access response; and wherein transmitting the SSB equivalent indication to the wireless device comprises transmitting the SSB equivalent indication to the wireless device in response to the connection request.

9. The method according to claim 1, wherein the second cell comprises a multiple-TRP cell that is defined in that at least two TRPs transmit identical synchronization signal blocks at a same time and frequency so that the wireless device perceives the identical synchronization signal blocks to represent a same synchronization signal block.

10. The method according to claim 9, wherein SSBs defining the multiple-TRP cell transmitted from different TRPs comprise the same physical cell identity of the multiple-TRP cell.

11. A network node comprising:

processing circuitry and a memory, said memory containing instructions executable by said processing circuitry whereby said network node is operative to:

receive, at a first transmission/reception point TRP, a random access request from a wireless device on a random access channel of a first cell associated with the first TRP; and after receiving the random access request, transmit, from the first TRP, a synchronization signal block SSB equivalent indication to the wireless device, wherein the SSB equivalent indication corresponds to a second cell and encodes a physical cell identity (PCI) of the second cell.

12. The network node of claim 11, wherein the network node is further operative to:

transmit, by the first TRP, a first SSB associated with the first TRP; and transmit, by the first TRP, a second SSB, wherein the second SSB is associated with the second cell.

13. The network node of claim 11, wherein the network node is operative to transmit the SSB equivalent indication in response to receiving a radio resource control RRC connection request from the wireless device.

14. The network node of claim 13, wherein the network node is operative to transmit the SSB equivalent indication to the wireless device in an RRC connection setup message.

15. The network node of claim 11, wherein the second cell is a multiple-TRP cell encompassing the first cell and a third cell.

16. The network node of claim 15, wherein the SSB equivalent indication corresponds to the multiple-TRP cell.

17. The network node of claim 11, wherein the network node is further operative to:

transmit a random access response to the wireless device in response to the random access request;

receive a connection request from the wireless device in response to the random access response; and transmit the SSB equivalent indication to the wireless device in response to the connection request.

18. The network node according to claim 11, wherein the second cell comprises a multiple-TRP cell that is defined in that at least two TRPs transmit identical synchronization signal blocks at a same time and frequency so that the wireless device perceives the identical synchronization signal blocks to represent a same synchronization signal block.

19. The network node according to claim 12, wherein the network node is operative to receive SSB configuration data from a NG-RAN node defining the first and second SSBs, wherein transmitting the first SSB and transmitting the second SSB are performed according to the received SSB configuration data.

* * * * *